United States Patent
Blanding

[19]

[11] Patent Number: 6,023,059

[45] Date of Patent: *Feb. 8, 2000

[54] DUAL FORMAT PRE-OBJECTIVE SCANNER

[75] Inventor: Douglass L. Blanding, Rochester, N.Y.

[73] Assignee: Eastman Kodak Company, Rochester, N.Y.

[*] Notice: This patent is subject to a terminal disclaimer.

[21] Appl. No.: 09/006,708

[22] Filed: Jan. 14, 1998

[51] Int. Cl.[7] .................................................. G02B 26/08
[52] U.S. Cl. ......................... 250/234; 250/236; 359/201; 359/216; 347/261
[58] Field of Search .................................... 250/234, 235, 250/236; 347/261; 359/216, 217, 201, 203

[56] References Cited

U.S. PATENT DOCUMENTS

| | | | |
|---|---|---|---|
| 3,944,323 | 3/1976 | Starkweather | 359/215 |
| 4,578,689 | 3/1986 | Spencer et al. | 347/129 |
| 4,651,169 | 3/1987 | Muka | 347/261 |
| 4,651,170 | 3/1987 | Chandler et al. | 347/259 |
| 4,734,715 | 3/1988 | Shiraishi | 347/261 |
| 4,953,036 | 8/1990 | Yoshimura | 358/400 |
| 5,239,313 | 8/1993 | Marko et al. | 347/132 |
| 5,255,115 | 10/1993 | Kikuchi | 359/209 |
| 5,274,492 | 12/1993 | Razzaghi | 359/202 |
| 5,289,001 | 2/1994 | Arimoto et al. | 250/236 |
| 5,861,977 | 1/1999 | Harrigan et al. | 359/203 |
| 5,867,298 | 2/1999 | Harrigan et al. | 359/201 |

*Primary Examiner*—Edward P. Westin
*Assistant Examiner*—Thanh X. Luu
*Attorney, Agent, or Firm*—Bayko, Carnegie, Hagan, Schoonmaker & Meyer LLP

[57] ABSTRACT

A dual format pre-objective scanner optionally, usable as a laser printer, having an incident beam from input optics incident on a polygon tower which is comprised of a first polygon and a second polygon rotating about an axis common to both the first and second polygon, the polygon tower capable of moving in a vertical direction so that the incident light is directed in a plane approximately perpendicular to the axis rotation of the first and second polygon, at either the first polygon or the second polygon, and with the polygon tower further being capable of moving in a lateral direction approximately perpendicular to the axis of rotation of the polygon tower or moved simultaneously both vertically and laterally so that incident beams on the facets of the first polygon become incident on the facets of the second polygon at approximately the same distance from a scan lens.

19 Claims, 2 Drawing Sheets

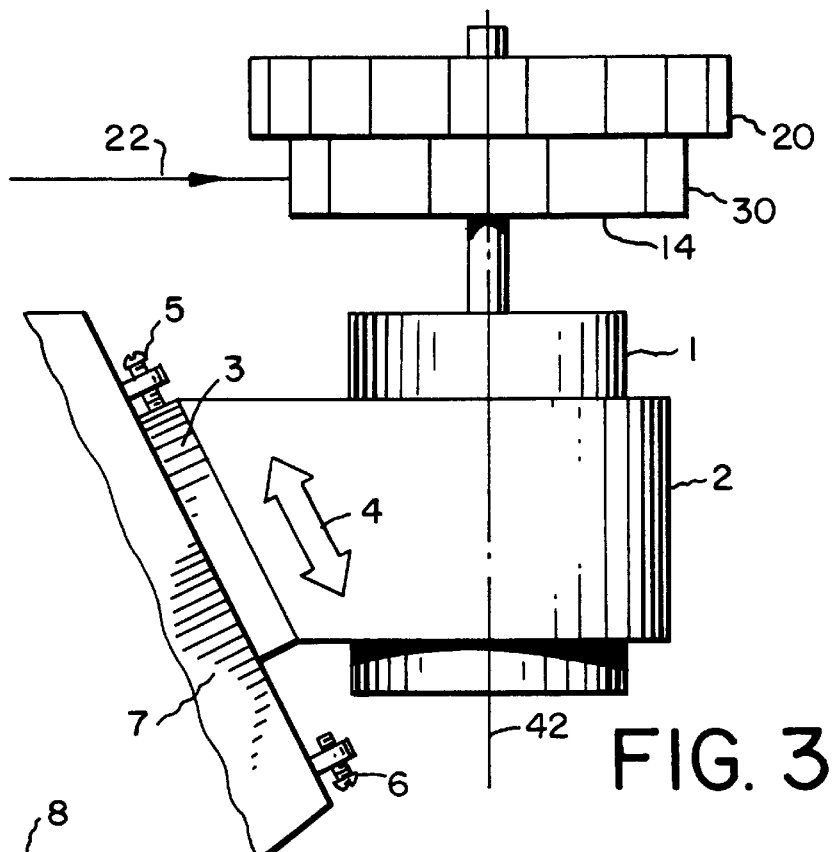
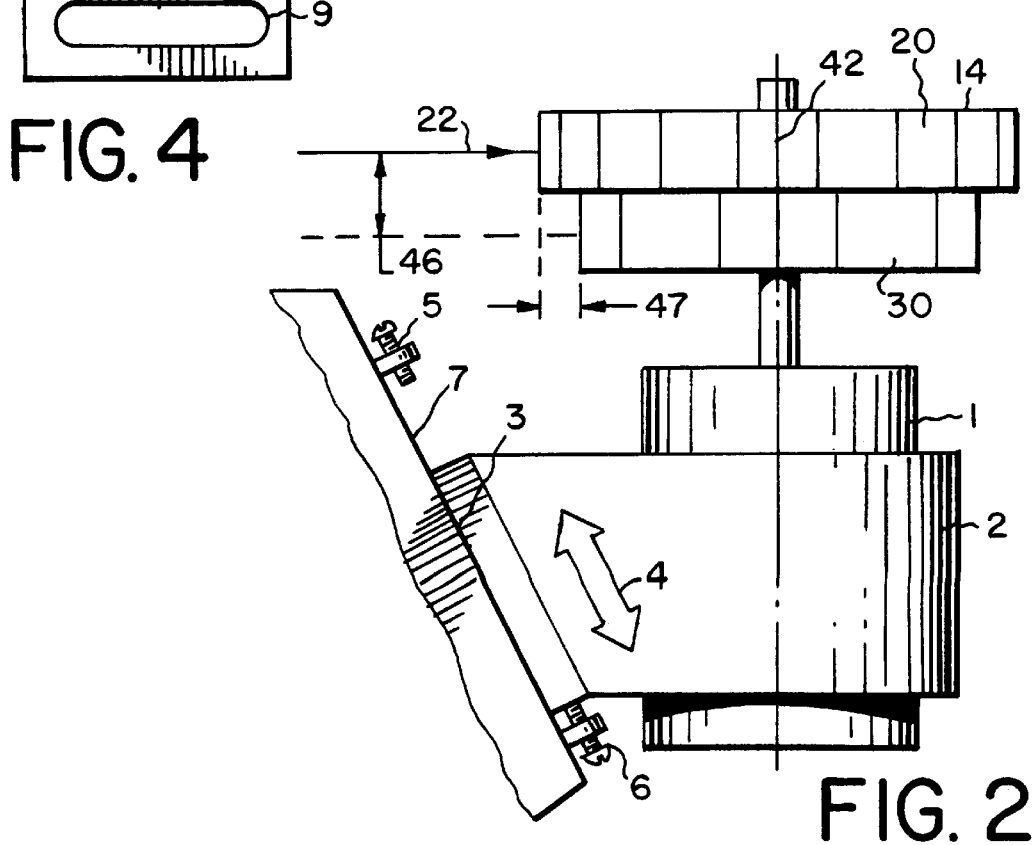

DUAL FORMAT PRE-OBJECTIVE SCANNER

FIELD OF THE INVENTION

This invention relates in general to scanners and printers using multi-faceted rotating polygon deflectors to expose photosensitive media and in particular to laser printers having the capability to print more than one image size and resolution.

BACKGROUND OF THE INVENTION

In creating digital images on photosensitive media there are at least two different imaging applications each with different requirements. The first application is for large format high quality images with fine text and graphics in which the production speed is not critical. These images are up to approximately 12 inches in width and use spot densities over 400 spots per inch. The second application is for smaller format images with large text and a requirement for high production speeds. In these images, the width is about 5 inches or smaller and the spot density is below about 400 spots per inch. In order to minimize the floor space required by two machines, it would be advantageous to use a single scanner in which the format and spot density can be switched easily between the two applications described. In addition, the scanner should use a single paper path for both formats and the cost to manufacture such a scanner should be lower than that of two separate machines.

Printing more than one image resolution with one scanner has been done by using a scanner with a reflecting surface which varies in width in the scanning direction. See G. Starkweather, U.S. Pat. No. 3,944,323. Other methods of using more than one image resolution with one scanner are shown in U.S. Pat. Nos. 5,289,001; 5,274,492; 5,255,115; 5,239,313; 4,953,036; 4,734,715; 4,578,689. None of these patents disclose the use of multiple polygons and none use more than one scan length.

The use of more than one format is described in U.S. Pat. Nos. 4,651,170 and 4,651,169 by J. Chandler, D. Kessler, and E. Muka. In these patents, the format in the line scan direction, the scan length, is changed by adjusting the space between the polygon deflector and the image forming medium. In order to maintain the beam focus on the medium in the scan section of the beam, the optics prior to the polygon deflector are modified. Also, the cylindrical mirror following the polygon is tilted and shifted in order to maintain the polygon mirror facet conjugate with the image forming medium. The page scan format is changed via a speed change in the moving medium. None of these patents, however, disclose a method or apparatus for multiple formats without changing the scan length or changing the attitude of the polygon deflectors.

SUMMARY OF THE INVENTION

It is an object of the invention to provide a dual format pre-objective scanner capable of producing images with different formats and spot densities.

The above and other objects are accomplished by a dual format pre-objective scanner having a light source incident on a polygon tower comprised of a first polygon having a first diameter and first number of facets and a second polygon having a second diameter and second number of facets rotating about an axis common to both first and second polygon. The polygon tower is moved in a vertical direction so that the incident light is directed in a plane approximately perpendicular to the axis rotation of the first and second polygon at either the first polygon or the second polygon. The polygon tower is also moved in a lateral direction approximately perpendicular to the axis rotation of the polygon tower. To change size and formats, the polygon tower is moved simultaneously both vertically and laterally so that incident beams on facets of the first polygon become incident on the facets of the second polygon at approximately the same distance from a scan lens. The simultaneous movement is accomplished by mounting the polygon tower on an inclined plane and moving the polygon tower along the inclined plane from one position to the other.

BRIEF DESCRIPTION OF THE DRAWINGS

FIG. 2 is a side view of an incident light beam being deflected from a second polygon of a polygon tower in a second position;

FIG. 3 is a side view of an incident light beam being deflected from a first polygon of a polygon tower in a first position; and FIG. 4 is a top view of an inclined pad of an embodiment of the present invention.

BRIEF DESCRIPTION OF THE INVENTION

Figure 1:
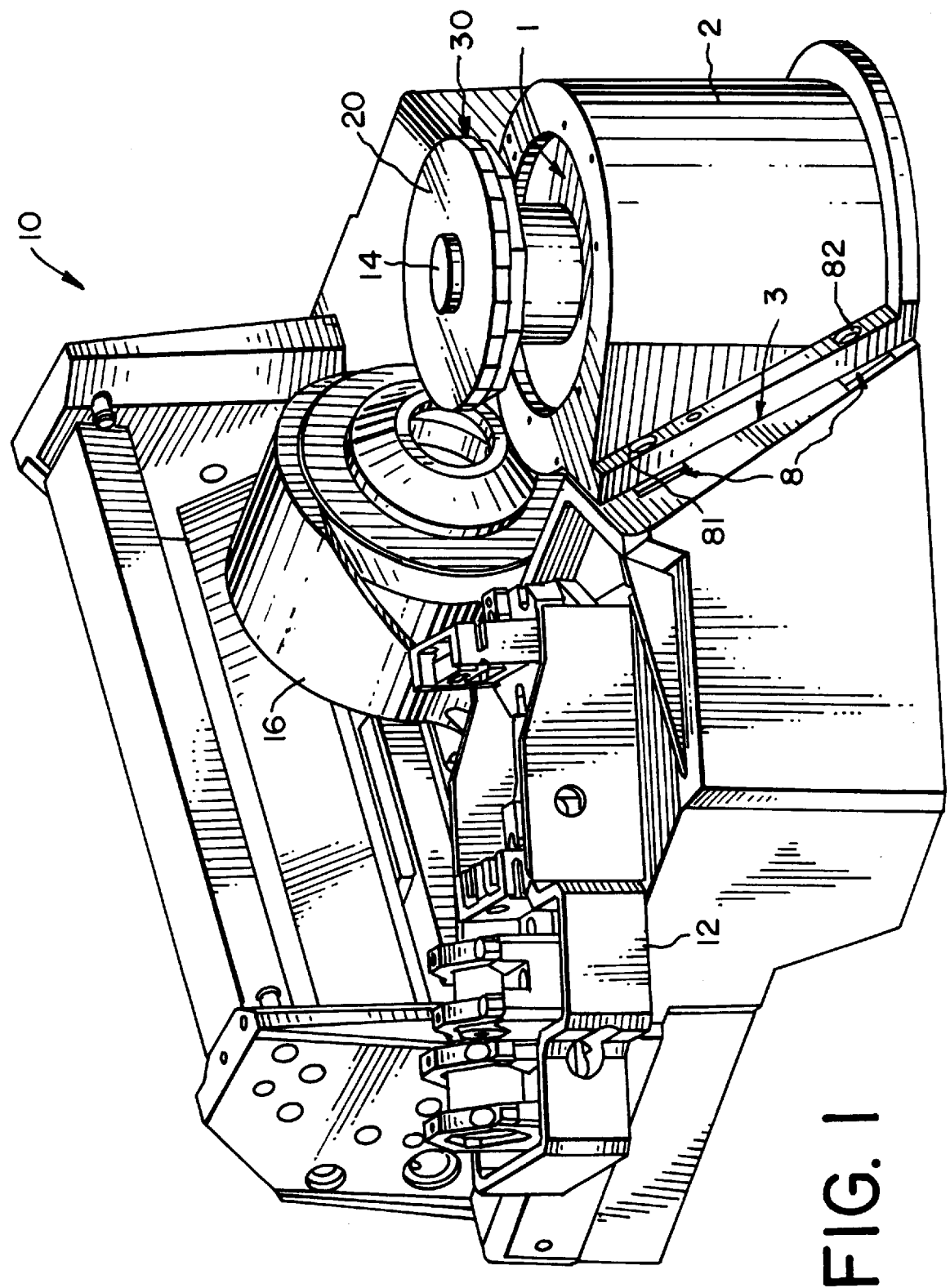
FIG. 1 is a perspective view of a scanner incorporating a multi-faceted dual polygon tower mounted on an inclined plane that is the present invention.

FIGS. 1, 2 and 3 show an example of the invention, but it should be understood that the invention is not restricted to the number of polygons shown, a particular number of facets per polygon, specific format sizes, or image resolutions. In FIG. 1, the dual format pre-objective scanner, referred to in general by numeral 10, is comprised of input optics 12, polygon tower 14 and scan lens 16. Input optics may consist of a variety of different sources such as a single mode laser, for example a semi-conductor or gas type laser, and lenses for focusing and collimating the light from the light source. The scan lens 16 focuses the light from the polygon tower 14 onto an image medium, not shown.

The term "scan lens" is used to refer to an optical system placed between the polygon deflector and the image receiving medium. Scan lenses are well known in the art and provide at least some of the following functions: Focusing the deflected beams of light to form pixels of the desired size at the medium in both the scan direction and cross scan direction of the beams, making the polygon facet optically conjugate to the medium, and placing the centroid of the pixel at the medium in an "f-theta" f-θ position in the scan section of the lens. The f-θ position is a distance along the scan line from the center of scan which is equal to the product of the scan lens focal length in the scan direction of the lens and the deflected beam angle with respect to the optical axis of the scan lens measured in radians as it enters the scan lens.

The dual format pre-objective scanner shown in FIGS. 1 and 2 operates by projecting a beam of light from input optics 12 onto either sixteen sided polygon 20 or eight sided polygon 30, both of which are mounted on a common axis of rotation 42. FIG. 1 is a perspective view of a scanner incorporating a multi-faceted dual polygon tower mounted on an inclined plane.

The diameter is proportional to the scan length and inversely proportional to the pixel size at the image. Therefore, one needs a larger polygon to scan more length and with higher resolution. The two requirements discussed above then would seem to be in conflict. Namely, a larger format and higher resolution both work to increase the polygon diameter. So, it would seem difficult to use the same or nearly the same size polygon for both a large format high resolution application and a small format low resolution application. However, when the need for printing speed in both devices is considered, a high number of facets will scan a larger number of lines per revolution than a low number of facets. Each facet produces one line of a raster scan while the scan in the perpendicular direction, referred to as the page scan direction, is usually accomplished by motion of the image medium with, for example, a cylindrical drum to which the image medium is attached.

The number of facets then can compensate for the scan length and resolution change and it does so in a desirable fashion for the two applications of interest. Namely, using a high number of facets for the low resolution small format compensates for the smaller size needed for this case in such a way that the polygons are nearly the same size. The idea is to keep a known quantity, called $SN^2/_O$, approximately constant for the two formats. The incidence angle would then be identical for both cases and the duty cycle and clip ratio would not be too different allowing the polygon for each format to be approximately the same size.

To ease mechanical changes between formats it would generally be desirable to have both input beams incident at the same angle to the facet at zero scan angle so that the angles between the input beam and deflected beam remain at a constant value. It would still be necessary to change the diameter of the input beam to adjust the resolution or pixel size at the image medium. With no change in the scan lens the most direct way to affect the pixel size is the beam diameter incident on the polygon. This method of printing then requires a modification in the optical system prior to the polygon for each resolution.

A solution to the number-of-facets, and the scan length problem in a multi-format is through the use of multiple polygons that are repositioned depending upon the format desired. Specifically, having multiple polygons of different diameters, each having a different number of facets with respect to the other polygons.

It will be important to keep the polygon facet in a conjugate relationship with the image medium in the page scan section of the optical system to avoid banding. This can be achieved by shifting each polygon into place in such a way that the distance, measured along the scan optical axis, from the facet at the center of scan to the first component of the f-θ or object lens is substantially the same.

The polygons must be shifted in two directions, vertically and laterally, as shown in FIG. 2 and FIG. 3. In FIG. 3 the incident beam strikes the smaller of the two polygons 30. After the vertical shift by a predetermined amount 46, as shown in FIG. 2, the incident beam strikes the larger of the two polygons 20. FIG. 2 also shows the lateral shift 47 of the two polygons. In FIG. 3 the incident beam is striking a facet of the smaller polygon. As shown in phantom, after the polygons have been shifted in the direction of the incident beam, the incident beam is striking a facet of the larger polygon.

This motion in the lateral and vertical directions can be accomplished simultaneously with the use of an inclined plane mounting 7 as shown in FIG. 2 and FIG. 3. The polygon bracket 2, which houses the polygon tower motor 1 and the polygon tower (20, 30) has an oblique face 3. As shown in FIG. 2 and FIG. 3, the range of motion 4 of the polygon bracket 2 is terminated by use of a stop 5 at the top of the mounting 7 and another stop 6 at bottom of the mounting 7. The stops (5, 6) can be adjustable so that the range of motion 4 of the polygon bracket 2 can be adjusted. FIG. 1 shows an alternate embodiment where the oblique face 3 of the polygon bracket 2 is fitted against inclined pads 8. In this alternate embodiment, the range of motion 4 of the polygon bracket 2 is limited by the length of the slot 9 of the inclined pad 8 as shown in FIG. 4. Cams 81 and 82 of the polygon bracket 2 fit within slots 9 of the inclined pads 8.

Optimally, each polygon should be positioned so as to equalize best the pixel growth due to clipping. If this is not possible because of a conflict with the requirement to maintain the page section conjugacy of the facet, then the best value is on that optimizes for the application which has the most sensitivity to variations in pixel growth.

The invention has been described in detail with particular reference to preferred embodiment thereof, but it will be understood that variations and modifications can be effected within the spirit and scope of the invention as set forth in the claims. For example, the polygon tower could be comprised of more than two polygons mounted on a common axis of rotation. Three or more polygons could be mounted on a common axis of rotation 42 to provide multiple formats for use in the laser scanner. Also, even though the invention is incorporated in a laser scanner as described, the invention could be used in printing applications. In addition the lateral and vertical shifts of the polygon tower could be done simultaneously or they could be performed sequentially.

Yet an additional modification that falls within the scope of the claims of the present invention is the number of facets may be any number of facets for the first polygon and the second polygon even though the specific examples shown is eight facets for the smaller polygon and sixteen facets for the larger polygon.

| PARTS LIST |
| --- |
| 1 Polygon tower motor |
| 2 Polygon bracket |
| 3 oblique face |
| 4 range of motion |
| 5 stop |
| 6 stop |
| 7 mounting |
| 8 inclined pad |
| 9 slot |
| 10 Pre-objective |
| 12 Input optics |
| 14 Polygon tower |
| 16 Scan Lens |
| 20 Sixteen sided polygon |
| 22 Incident beam |
| 30 Eight sided polygon |
| 42 Axis of rotation |
| 46 Vertical shift |
| 47 Lateral shift |
| 81 Cam |
| 82 Cam |

What is claimed is:

1. A dual format pre-objective scanner comprising a polygon tower comprised of a first polygon having a first diameter and a first number of facets and a second polygon having a second diameter and a second number of facets, said polygon tower mounted for rotation on an axis common to said first and second polygon;

a light source producing a beam of light incident on said polygon tower;

a scan lens for receiving light from said polygon tower; and wherein said polygon tower is moved in a direction parallel to said axis of rotation to shift a point of contact of said incident beam between said first polygon and said second polygon and said polygon tower is moved in a lateral direction, simultaneously with said movement in said parallel direction, in a plane approximately perpendicular to said axis of rotation so that a first distance between said first polygon and said scan lens when said beam of light is incident on said first polygon is approximately equal to a second distance between said second polygon and said scan lens when said beam of light is incident on said second polygon.

2. A multiple format scanner comprising:

a polygon tower mounted for rotation about an axis wherein said polygon tower has at least:

a first polygon having a first number of facets;

a second polygon having a second number of facets, said axis is common to both said first polygon and said second polygon; and wherein said polygon tower is moveably attached to a mounting on an inclined plane.

3. A multiple format scanner as in claim 2 wherein said mounting enables said polygon tower to be moved in a direction parallel to said axis of rotation.

4. A multiple format scanner as in claim 2 wherein said mounting enables said polygon tower to be moved in a lateral direction in a plane approximately perpendicular to said axis of rotation.

5. A multiple format scanner as in claim 3 wherein said polygon tower is moved in a lateral direction in a plane approximately perpendicular to said axis of rotation.

6. A multiple format scanner as in claim 4 wherein said polygon tower is moved in a direction parallel to said axis of rotation.

7. A multiple format scanner as in claim 5 wherein said mounting enables said polygon tower to be moved in said lateral direction and said parallel direction simultaneously.

8. A multiple format scanner as in claim 6 wherein said mounting enables said polygon tower to be moved in said lateral direction and said parallel direction simultaneously.

9. A multiple format scanner as in claim 2 wherein said mounting has a stop at a top side of said mounting.

10. A multiple format scanner as in claim 2 wherein said mounting has a stop at a bottom side of said mounting.

11. A multiple format scanner as in claim 2 wherein a diameter of said first polygon is greater than a second diameter of said second polygon.

12. A multiple format scanner as in claim 2 wherein said polygon tower is moved in a direction parallel to said axis to change a point of contact of a beam of light on said polygon tower from said first polygon to said second polygon.

13. A multiple format scanner as in claim 2 wherein said polygon tower is moved in a direction parallel to said axis to change a point of contact of a beam of light on said polygon tower from said second polygon to said first polygon.

14. A multiple format scanner as in claim 2 wherein said polygon tower is moved in a lateral direction that is approximately perpendicular to said axis to change a point of contact of a beam of light on said polygon tower from said first polygon to said second polygon.

15. A multiple format scanner as in claim 2 wherein said polygon tower is moved in a lateral direction that is approximately perpendicular to said axis to change a point of contact of a beam of light on said polygon tower from said second polygon to said first polygon.

16. A multiple format scanner as in claim 2 wherein said polygon tower is moved in a direction parallel to said axis, and, simultaneously, moved in a lateral direction that is approximately parallel to said axis to change a point of contact of a beam of light on said polygon tower between said first polygon and said second polygon.

17. A multiple format scanner as in claim 2 wherein said polygon tower is moved in a direction parallel to said axis, and, simultaneously, moved in a lateral direction that is approximately parallel to said axis to change a point of contact of a beam of light on said polygon tower between said second polygon and said first polygon.

18. A multiple format scanner as in claim 9 wherein said stop is adjustable.

19. A multiple format scanner as in claim 10 wherein said stop is adjustable.

* * * * *